United States Patent
Kooiman et al.

(10) Patent No.: US 10,040,534 B2
(45) Date of Patent: Aug. 7, 2018

(54) FUSELAGE TO WING ATTACHMENT

(71) Applicant: Bell Helicopter Textron Inc., Fort Worth, TX (US)

(72) Inventors: James Everett Kooiman, Fort Worth, TX (US); Mark Loring Isaac, Fort Worth, TX (US); John Elton Brunken, Jr., Colleyville, TX (US); John McCullough, Weatherford, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 365 days.

(21) Appl. No.: 14/960,648

(22) Filed: Dec. 7, 2015

(65) Prior Publication Data
US 2017/0158306 A1    Jun. 8, 2017

(51) Int. Cl.
| | |
|---|---|
| *B64C 1/26* | (2006.01) |
| *B64C 29/00* | (2006.01) |
| *B64C 1/14* | (2006.01) |
| *B64C 3/18* | (2006.01) |

(52) U.S. Cl.
CPC .............. *B64C 1/26* (2013.01); *B64C 1/1423* (2013.01); *B64C 3/187* (2013.01); *B64C 29/0033* (2013.01)

(58) Field of Classification Search
CPC ................................. B64C 1/26; B64C 1/1407
See application file for complete search history.

(56) References Cited

U.S. PATENT DOCUMENTS

| | | | |
|---|---|---|---|
| 3,119,441 A * | 1/1964 | Furry, Jr. ............... | B64C 1/1407 160/212 |
| 7,887,009 B2 | 2/2011 | Keeler, Jr. et al. | |
| 8,991,762 B2 * | 3/2015 | Voss ........................ | B64C 1/26 244/119 |
| 9,656,736 B2 * | 5/2017 | Guillemaut ............. | B64C 1/061 |
| 2008/0272236 A1 | 11/2008 | Rawdon et al. | |
| 2011/0036941 A1 * | 2/2011 | Cazals ...................... | B64C 3/38 244/46 |
| 2014/0231586 A1 | 8/2014 | Brown et al. | |

(Continued)

OTHER PUBLICATIONS

Examination Report for related European Patent Application No. 16202514.2, dated Mar. 21, 2017, 4 pages.

(Continued)

*Primary Examiner* — Brian M O'Hara
(74) *Attorney, Agent, or Firm* — Patent Capital Group

(57) ABSTRACT

According to one embodiment, an aircraft features a fuselage, a wing member, and two fuselage beam. The fuselage features a first plurality of structural supports, a second plurality of structural supports, a first opening disposed between the first plurality of structural supports, and a second opening disposed between the second plurality of structural supports. The wing member is disposed above the first opening and above the second opening. The wing features a plurality of ribs including a first rib and a second rib. The first fuselage beam couples the first rib of the wing member to the fuselage and has an elongated body portion extending across the first plurality of structural supports. The second fuselage beam couples the second rib of the wing member to the fuselage and features an elongated body portion extending across the second plurality of structural supports.

18 Claims, 5 Drawing Sheets

(56) References Cited

U.S. PATENT DOCUMENTS

| | | | |
|---|---|---|---|
| 2016/0152315 A1* | 6/2016 | Martino Gonzalez | B64C 1/06 |
| | | | 244/13 |
| 2016/0185439 A1* | 6/2016 | Martino Gonzalez | B64C 1/16 |
| | | | 244/35 R |
| 2016/0229513 A1* | 8/2016 | Scheel | B64C 1/10 |

OTHER PUBLICATIONS

European Search Report for related European Patent Application No. 16202514.2, dated Jan. 3, 2017, 4 pages.

* cited by examiner

FUSELAGE TO WING ATTACHMENT

GOVERNMENT RIGHTS

At least some of the subject matter of this application may have been made with government support under W911W6-13-2-0001 awarded by the United States Army under the Future Vertical Lift program. The government may have certain rights in the invention.

TECHNICAL FIELD

This invention relates generally to aircraft fuselages, and more particularly, to a fuselage to wing attachment.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to provide a wing located over a door opening in an aircraft such as a tiltrotor aircraft. A technical advantage of one embodiment may include the capability to accommodate the various forces transmitted from the wing to the fuselage of an aircraft such as a tiltrotor aircraft.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 3 shows a perspective view of the structural configuration with the wing enclosed;

FIG. 4 shows a perspective view of the structural configuration of FIG. 3 with the external skin of the wing removed;

FIG. 5 shows a side view of some of the main structural elements of the tiltrotor aircraft of FIG. 1; and FIG. 6 shows an end view of some of the main structural elements of the tiltrotor aircraft of FIG. 1.

DETAILED DESCRIPTION OF THE DRAWINGS

Figure 1:
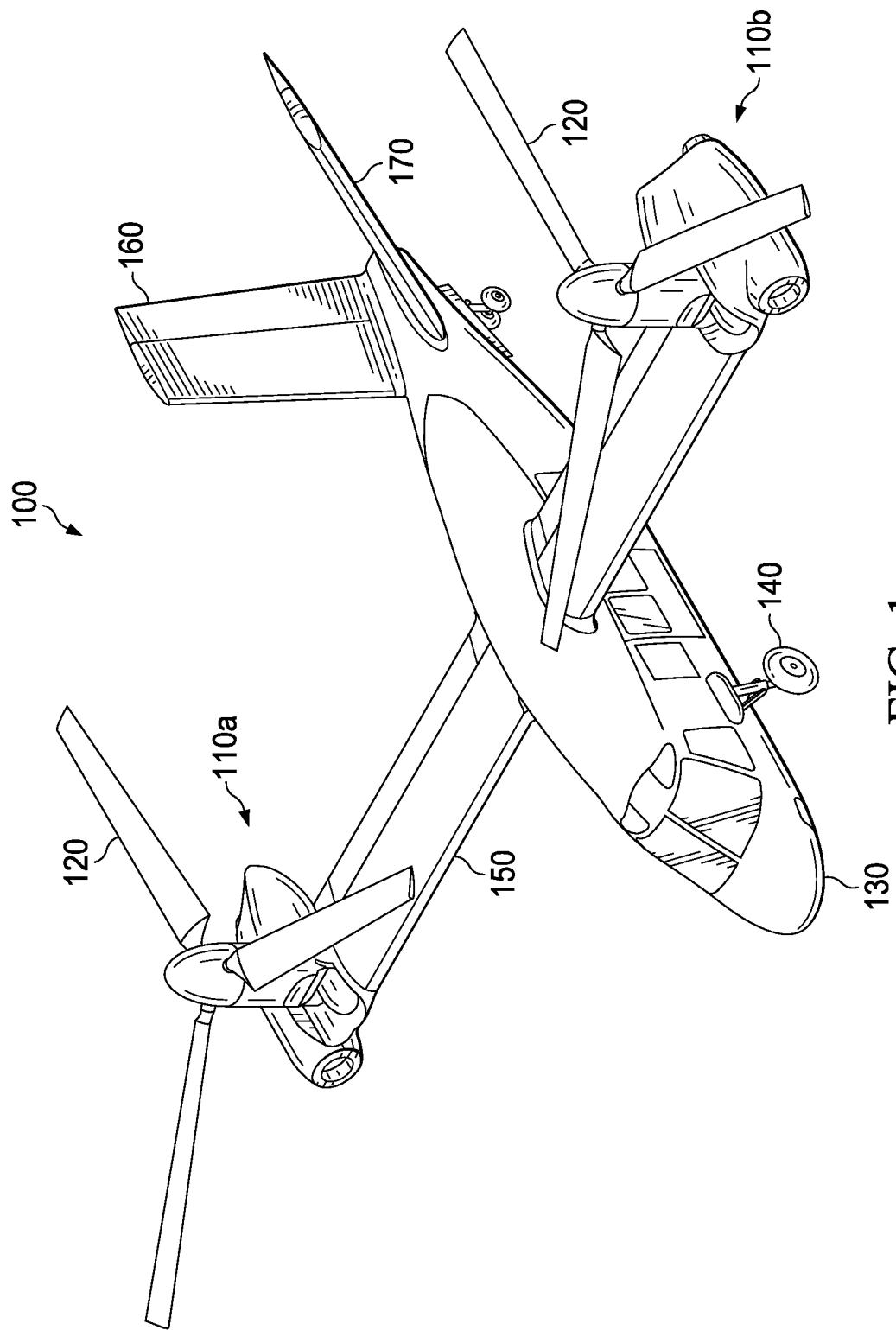
FIG. 1 shows a tiltrotor aircraft according to one example embodiment.

FIG. 1 shows a rotorcraft 100 according to one example embodiment. Rotorcraft 100 features rotor systems 110a and 110b, blades 120, a fuselage 130, a landing gear 140, a wing 150, and an empennage 160.

Rotor system 110 may rotate blades 120. Rotor system 110 may include a control system for selectively controlling the pitch of each blade 120 in order to selectively control direction, thrust, and lift of rotorcraft 100. In the example of FIG. 1A, rotorcraft 100 represents a tiltrotor aircraft, and rotor systems 110a and 110b feature rotatable nacelles. In this example, the position of nacelles 110a and 110b, as well as the pitch of rotor blades 120, can be selectively controlled in order to selectively control direction, thrust, and lift of tiltrotor aircraft 100.

Fuselage 130 represents the main body of rotorcraft 100 and may be coupled to rotor system 110 (e.g., via wing 150) such that rotor system 110 and blades 120 may move fuselage 130 through the air. Landing gear 140 supports rotorcraft 100 when rotorcraft 100 is landing and/or when rotorcraft 100 is at rest on the ground.

Teachings of certain embodiments relating to rotor systems described herein may apply to rotor system 110 and/or other rotor systems, such as non-tilting rotor and helicopter rotor systems. It should also be appreciated that teachings from rotorcraft 100 may apply to aircraft other than rotorcraft, such as airplanes and unmanned aircraft, to name a few examples.

In the example of FIG. 1, tiltrotor aircraft 100 may operate in a helicopter mode by tilting the nacelles upright and in an airplane mode by tilting the nacelles forward. Tiltrotor aircraft 100 may generate greater forward speed in airplane mode than in helicopter mode because, in airplane mode, blades 120 are oriented to generate greater thrust propelling the aircraft forward (somewhat analogous to a propeller).

Rotorcraft 100 also features at least one empennage 160. Empennage 160 represents a flight control surface coupled to the tail portion of fuselage 130. In the example of FIG. 1, rotorcraft 100 features two empennage sections 160. In this example embodiment, the combination of the two empennage sections 160 may represent a v-tail configuration.

In operation, rotor systems 110a and 110b may generate vibrations, pitching moments, and other forces that may be transferred from the nacelles to fuselage 130 via wing 150. These forces and vibrations may be more extreme than the forces imparted by a wing on a typical fixed-wing aircraft due to the activity of rotor systems 110a and 110b. Accordingly, the structure of rotorcraft 100 should be configured to accommodate these forces.

In a typical aircraft, a wing might be attached to the fuselage via a combination of pins and links. These links may be capable of transmitting load from the wing into the fuselage while permitting the wing to bend and flex independently of the fuselage.

In the example of FIG. 1, however, fuselage 130 features two large openings 132a and 132b underneath wing 150. These openings 132a and 132b are both large enough to allow ingress and egress of human passengers, such as military personnel. Each opening has a corresponding door 134a and 134b that is configured to open and close the corresponding openings 132a and 132b.

Figure 2:
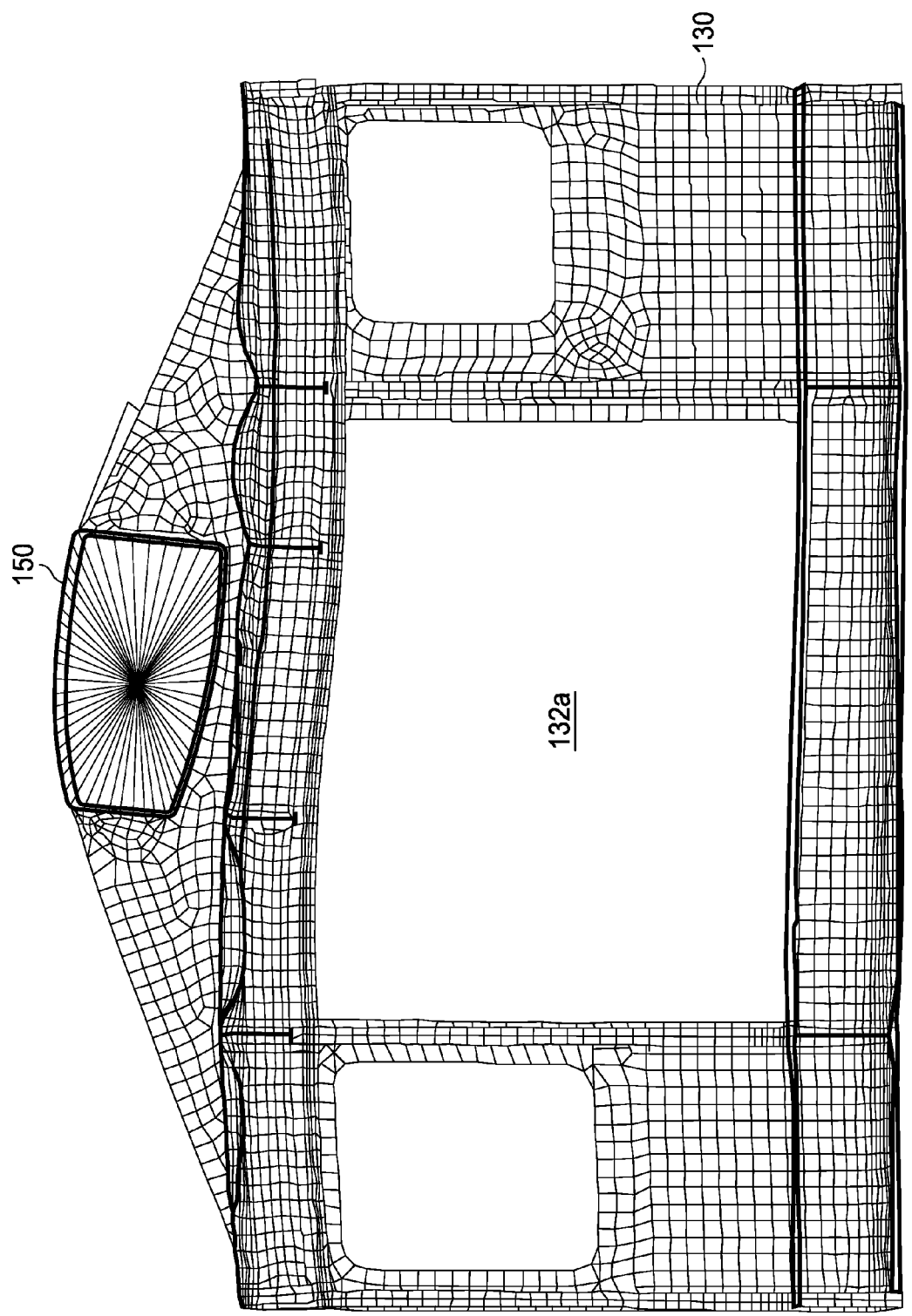
FIG. 2 shows a stress analysis of the wing and one of the openings of the tiltrotor aircraft of FIG. 1 one example configuration.

The presence of openings 132a and 132b may present technical challenges to achieve the necessary pitch stiffness requirements. For example, FIG. 2 shows a stress analysis of wing 150 over opening 132a in one example configuration. In the example of FIG. 2, moment forces exerted on wing 150 cause wing 150 to exert significant downward forces on the aft portion of opening 132a. As seen in this example, these moment forces cause deformation of the top of opening 132a because opening 132a does not contain the necessary structure to carry these forces.

Because the presence of openings 132a and 132b present such technical challenges, replacing openings 132a and 132b with structure could overcome these technical challenges. However, in some circumstances, the presence of openings 132a and 132b under wing 150 are required in order to perform certain missions. For example, placing openings 132a and 132b under wing 150 may improve troop ingress and egress as compared to a rear-hatch door. In addition, placing openings 132a and 132b under wing 150 may allow wing 150 to also function as a windscreen by blocking the airflow (e.g., downwash) generated by rotor systems 110a and 110b. Placing openings 132a and 132b under wing may also improve fast rope and other activities during hovering.

Accordingly, teachings of certain embodiments recognize the capability to provide openings under the wing of an aircraft such as rotorcraft 100 even though doing so may raise technical challenges. Teachings of certain embodiments also recognize the capability to provide openings under the wing of an aircraft such as rotorcraft 100 even though doing so may result in a heavier design, a more complicated assembly process, or other penalties because of the steps that may be taken to overcome the technical challenges.

Figure 3:
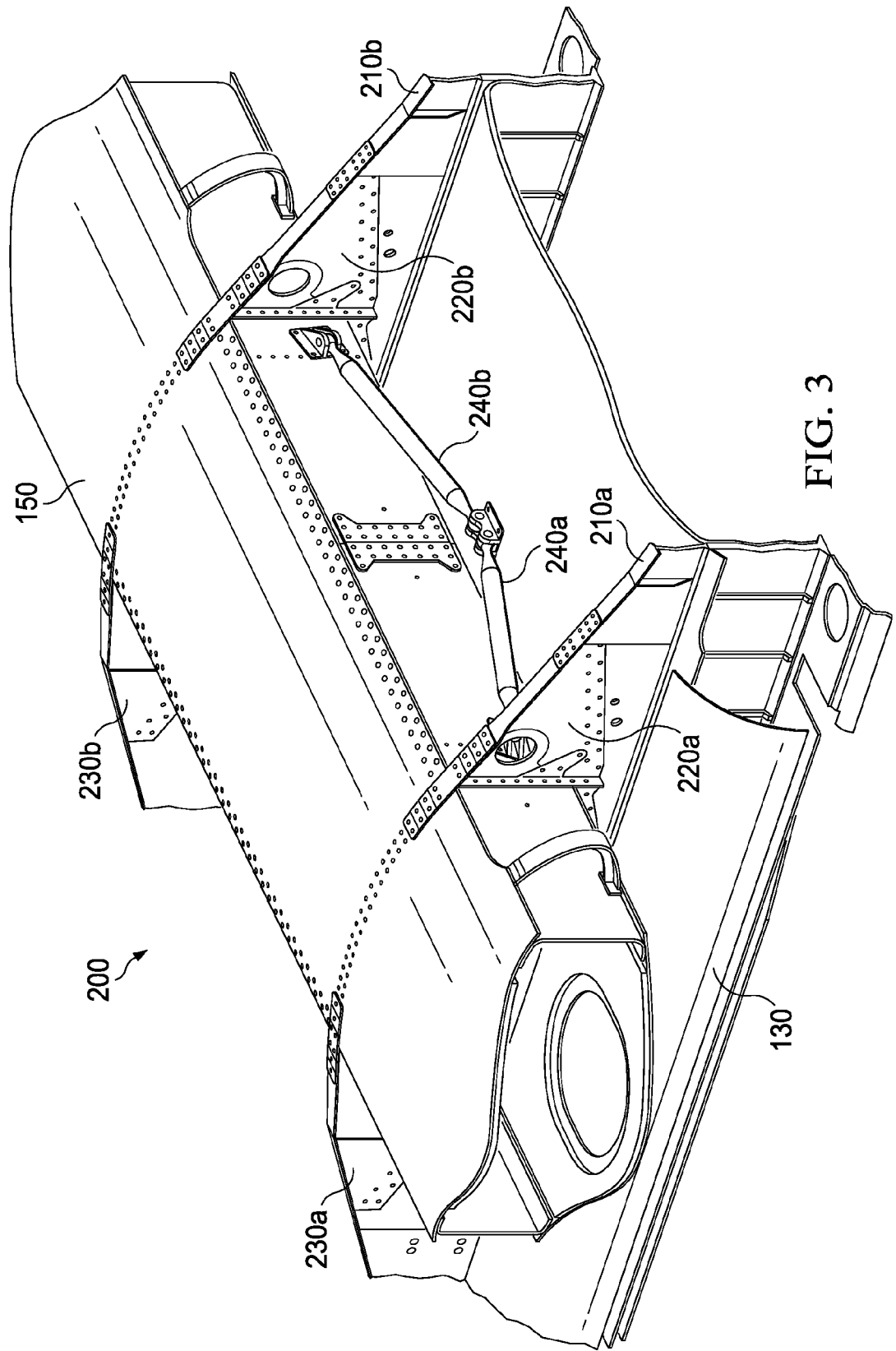
FIGS. 3-6 show a structural configuration installed on the tiltrotor aircraft of FIG. 1.
Figure 4:
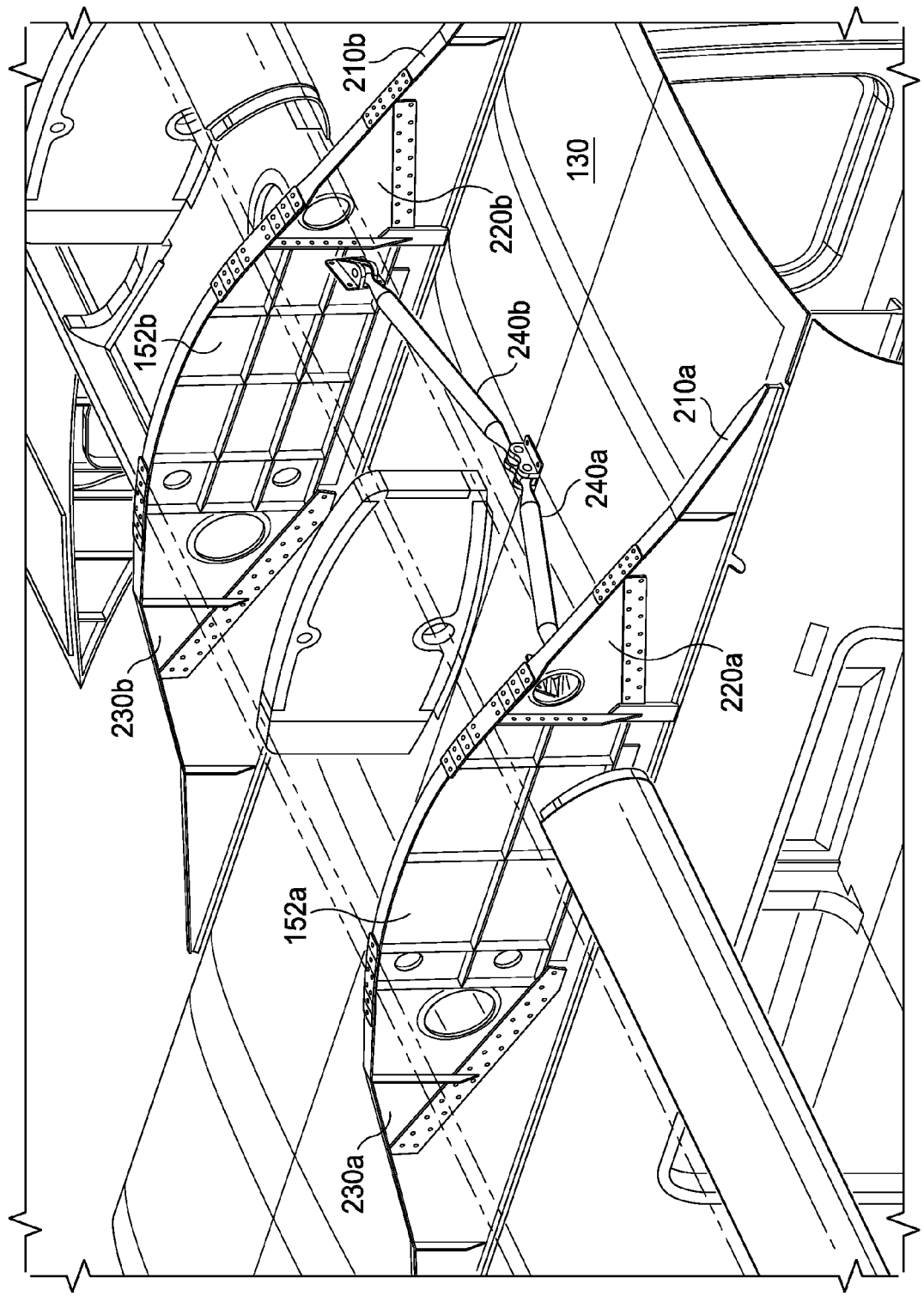
Figure 5:
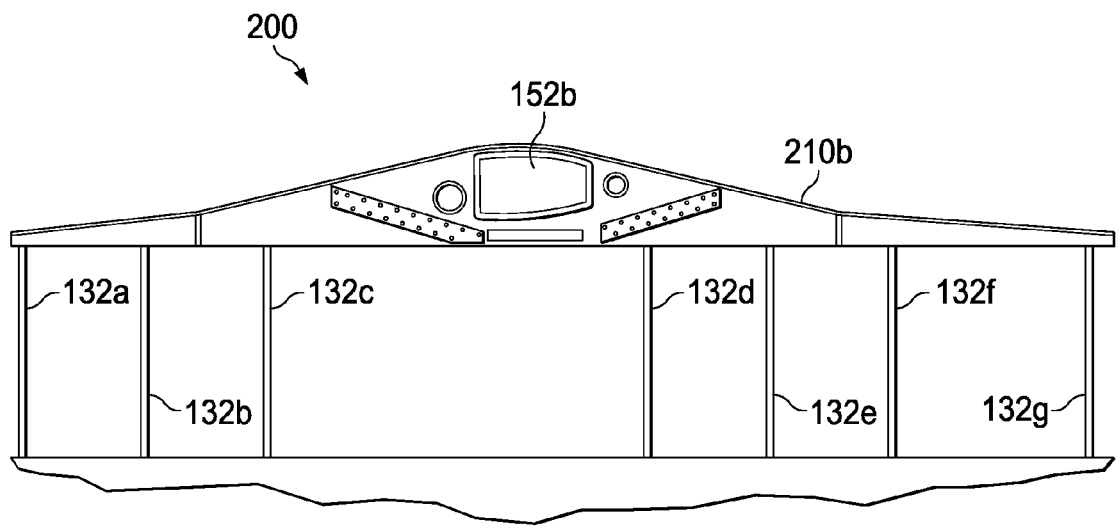
Figure 6:
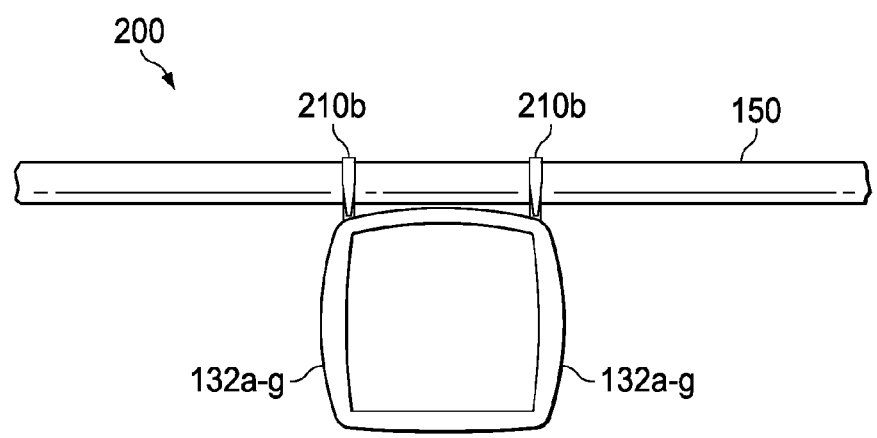

FIGS. 3-6 show a structural configuration 200 that may overcome the technical challenges incurred when placing openings 132a and 132b under wing 150 according to one example embodiment. FIG. 3 shows a perspective view of structural configuration 200 with wing 150 enclosed, FIG. 4 shows a perspective view of structural configuration 200 with the external skin of wing 150 removed, FIG. 5 shows a side view of some of the main structural elements of rotorcraft 100, and FIG. 6 shows an end view of some of the main structural elements of rotorcraft 100.

In the example of FIGS. 3-6, structural configuration 200 features fuselage beams 210a and 210b, forward attach fittings 220a and 220b, aft attach fittings 230a and 230b, and lateral links 240a and 240b. As also seen in the example of FIG. 4, wing 150 features multiple ribs 152, including ribs 152a and 152b.

In these examples, each fuselage beam couples wing 150 to fuselage 130. For example, fuselage beam 210a couples rib 152a of wing 150 to fuselage 130, and fuselage beam 210b couples rib 152b of wing 150 to fuselage 130.

In these examples, the fuselage beams are coplanar with their respective wing ribs. In fact, the fuselage beams form a continuous structural element with their respective wing ribs such that each beam/rib combination operates substantially like a single member. In the example of FIGS. 3 and 4, each rib 152a and 152b is joined to its corresponding fuselage beam 210a and 210b via a single, uninterrupted joint. This single, uninterrupted joint eliminates any major openings or gaps that might be present on pinned wing attachments and allows for forces to be transmitted between the rib and the beam as if they were a single structural element.

Teachings of certain embodiments recognize that attaching the wing ribs of wing 150 to fuselage beams 210a and 210b in a coplanar, continuous manner, such as shown in FIGS. 3-4, may allow structural configuration 200 to accommodate the various forces imparted by wing 150 even though openings 132a and 132b are located under wing 150.

As will be explained in greater detail below, both fuselage beams include an elongated body portion that extends across their corresponding openings in fuselage 130 and distributes loads to both sides of the corresponding openings, as seen in the example of FIG. 2.

In the examples of FIGS. 3 and 4, wing 150 has an airfoil cross-sectional shape. As such, ribs 152a and 152b of wing 150 feature an outer contour that corresponds to this airfoil shape. Because, as explained above, ribs 152a and 152b may be coupled to fuselage beams 210a and 210b along a single, uninterrupted joint such that each rib/beam combination forms a coplanar, continuous, structural element, fuselage beams 210a and 210b also feature a top surface that corresponds to the outer contour of the wing ribs. In this example, the top surface of fuselage beams 210a and 210b can receive the wing ribs 152a and 152b without creating any major openings or gaps between fuselage beams 210a and 210b and wing ribs 152a and 152b.

In the example of FIGS. 3 and 4, however, the top surfaces of fuselage beams 210a and 210b do not follow the entire contours of wing ribs 152a and 152b. Instead, only the bottom portion of wing ribs 152a and 152b are received by fuselage beams 210a and 210b, and the top portion of wing ribs 152a and 152b follow the aerodynamic profile of the top of wing 150. This arrangement creates two gaps between the top and bottom portions of wing ribs 152a and 152b: one gap forward of wing ribs 152a and 152b, and one gap aft of wing ribs 152a and 152b.

These gaps are filled by forward attach fittings 220a and 220b and aft attach fittings 230a and 230b. In these examples, forward attach fittings 220a and 220b and aft attach fittings 230a and 230b are coplanar with their respective fuselage beams and wing ribs. In fact, the fuselage beams, wing ribs, and attach fittings form continuous structural elements such that each beam/rib/fitting combination operates substantially like a single member.

In these examples, fuselage beam 210a, wing rib 152a, forward attach fitting 220a, and aft attach fitting 230a form a single, structural member that resembles an I-beam with a variable web height. For example, fuselage beam 210a provides the lower flange and a lower portion of the web of the I-beam, and fuselage beam 210a, wing rib 152a, forward attach fitting 220a and aft attach fitting 230a each provide a portion of the upper flange and an upper portion of the web of the I-beam. This configuration allows the combined structural element to resist shear and bending forces, which makes the configuration particularly well suited to respond to loads imparted by wing 150 during operation of rotorcraft 100.

As stated above, both fuselage beams include an elongated body portion that extends across their corresponding openings in fuselage 130 and distributes loads to both sides of the corresponding openings instead of focusing the forces on the top of the openings, as is the case in FIG. 2. More specifically, each opening 132a and 132b is surrounded by a pair of structural supports, and the elongated body portions of fuselage beams 210a and 210b span these supports. Because ribs 152a and 152b form continuous structural elements with corresponding fuselage beams 210a and 210b, the elongated body portions of fuselage beams 210a and 210b allow the forces received from wing 150 to be distributed to the structural supports surrounding openings 132a and 132b, which are better equipped to accommodate those forces instead of the open space within openings 132a and 132b.

In fact, as seen in the example of FIGS. 5 and 6, fuselage 130 includes seven structural supports 132a-132g, although embodiments of fuselage 130 may include more or fewer supports. In this example embodiment, the elongated portion of each fuselage beam extends such that the forces are distributed to each of the seven structural supports 132a-132g. Looking from the end view of FIG. 6, each fuselage beam 210a and 210b is aligned over the top of the structural supports 132a-132g such that the forces are directly transferred to the structural supports 132a-132g.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. An aircraft, comprising:
a fuselage comprising a first plurality of structural supports, a second plurality of structural supports, a first opening between the first plurality of structural supports, and a second opening between the second plurality of structural supports;
a wing member disposed above the first opening and above the second opening, the wing member comprising a plurality of ribs, the plurality of ribs comprising a first rib and a second rib;
a first fuselage beam coupling the first rib of the wing member to the fuselage, the first fuselage beam comprising an elongated body portion extending across the first plurality of structural supports; and
a second fuselage beam coupling the second rib of the wing member to the fuselage, the second fuselage beam comprising an elongated body portion extending across the second plurality of structural supports, wherein the aircraft is a tiltrotor aircraft comprising a rotor system that is, at least in part, tiltable between a helicopter mode position and an airplane mode position.

2. The aircraft of claim 1, further comprising:
a power train comprising a power source and a drive shaft in mechanical communication with the power source; and
the rotor system coupled to the wing member and in mechanical communication with the drive shaft.

3. The aircraft of claim 1, wherein:
the first plurality of structural supports comprises a first support and a second support;
the first opening is between the first support and the second support; and
the elongated body portion of the first fuselage beam extends across the first support and the second support.

4. The aircraft of claim 1, wherein:
the first plurality of structural supports comprises a first support, a second support, and a third support;
the first opening is between the first support and the second support; and
the elongated body portion of the first fuselage beam extends across the first support, the second support, and the third support.

5. The aircraft of claim 1, wherein:
the first plurality of structural supports comprises a first support, a second support, a third support, a fourth support, a fifth support, and a sixth support;
the first opening is between the third support and the fourth support; and
the elongated body portion of the first fuselage beam extends across the first support, the second support, the third support, the fourth support, the fifth support, and the sixth support.

6. The aircraft of claim 1, wherein the first rib and the first fuselage beam are coplanar.

7. The aircraft of claim 1, wherein the first rib and the first fuselage beam form a continuous structural element.

8. The aircraft of claim 1, wherein the first rib is joined to the first fuselage beam along a single, uninterrupted joint.

9. The aircraft of claim 1, wherein:
the wing member comprises an airfoil shape;
the first rib comprises an outer contour corresponding to the airfoil shape; and
the first fuselage beam comprises a top surface corresponding to the outer contour of the first rib.

10. The aircraft of claim 9, wherein the first rib is coupled to the first fuselage beam where the top surface of the first fuselage beam receives the outer contour of the first rib.

11. The aircraft of claim 1, wherein the first rib and the first fuselage beam form, in combination, an I-beam, wherein the first fuselage beam forms a lower portion of the I-beam and the first rib forms an upper portion of the I-beam.

12. The aircraft of claim 1, wherein the first opening is a first door opening and the second opening is a second door opening, the aircraft further comprising a first door configured to open and close the first door opening and a second door configured to open and close the second door opening.

13. The aircraft of claim 1, wherein the first and second openings are both so dimensioned as to allow ingress and egress of a human passenger.

14. The aircraft of claim 1, further comprising a first forward attach fitting coupled to the first fuselage beam and the first rib forward of the wing member and a first aft attach fitting coupled to the first fuselage beam and the first rib aft of the wing member.

15. The aircraft of claim 14, wherein the first rib, the first fuselage beam, the first forward attach fitting, and the first aft attach fitting are coplanar.

16. The aircraft of claim 14, wherein the first rib, the first fuselage beam, the first forward attach fitting, and the first aft attach fitting form a continuous structural element.

17. The aircraft of claim 14, wherein the first fuselage beam forms an I-beam in combination with the first rib, the first forward attach fitting, and the first aft attach fitting, wherein the first fuselage beam forms a lower portion of the I-beam and the first rib, the first forward attach fitting, and the first aft attach fitting, form an upper portion of the I-beam.

18. The aircraft of claim 14, further comprising one or more lateral links coupled between a roof of the fuselage and at least one of the first rib, the first fuselage beam, the first forward attach fitting, and the first aft attach fitting.

* * * * *